Aug. 22, 1950     M. DADERKO, SR., ET AL     2,519,744
SAW SET

Filed July 21, 1948                                                                3 Sheets-Sheet 1

Michael Daderko, Sr.
Robert A. Lisella
John Daderko
INVENTORS

BY *Clarence A. O'Brien*
*and Harvey B. Jacobson*
Attorneys

Aug. 22, 1950  M. DADERKO, SR., ET AL  2,519,744
SAW SET
Filed July 21, 1948   3 Sheets-Sheet 2
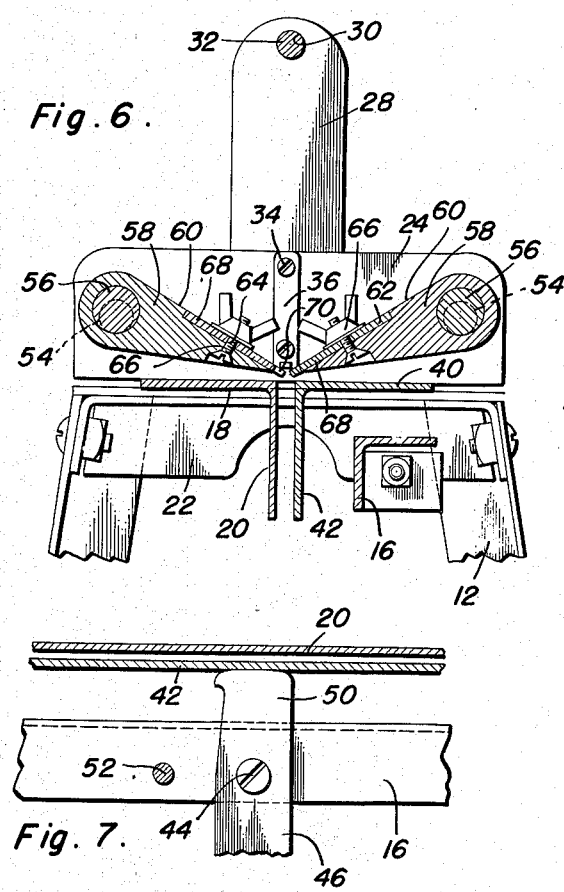
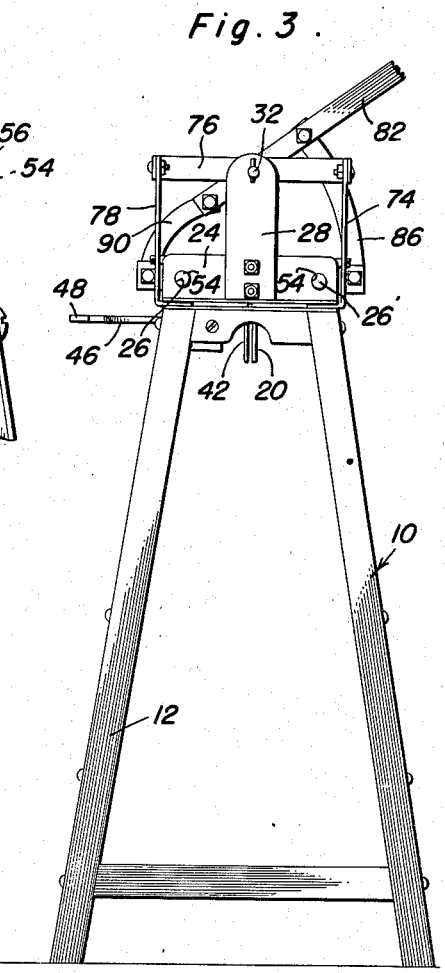
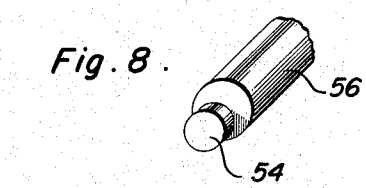
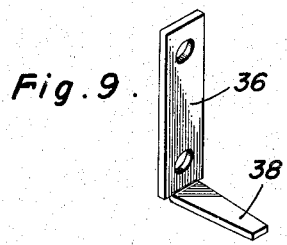
Michael Daderko, Sr.
Robert A. Lisella
John Daderko
INVENTORS
BY *Clarence A. O'Brien*
*and Harvey B. Jacobson*
Attorneys

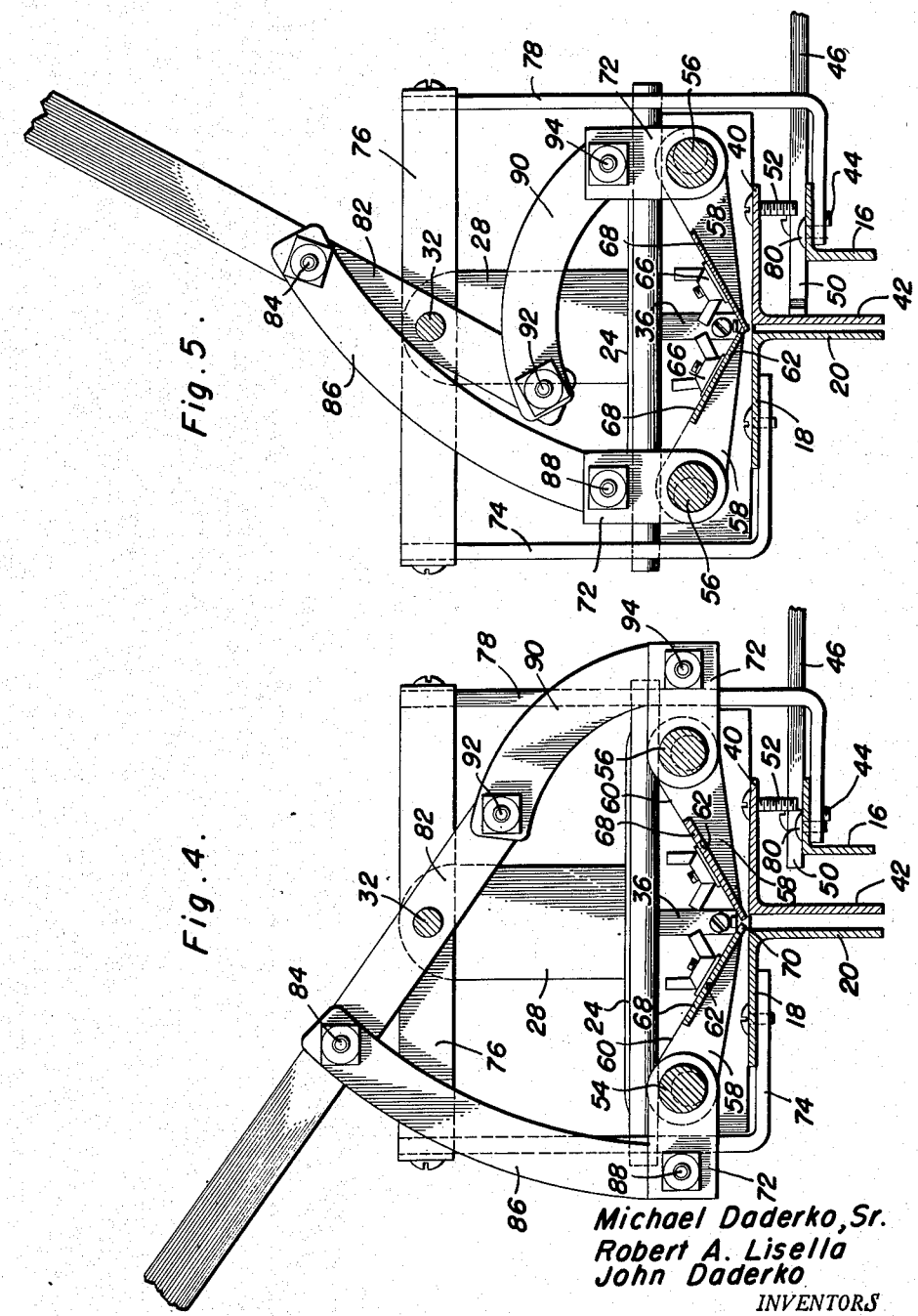
Michael Daderko, Sr.
Robert A. Lisella
John Daderko
INVENTORS

Patented Aug. 22, 1950

2,519,744

UNITED STATES PATENT OFFICE 2,519,744

SAW SET

Michael Daderko, Sr., and Robert A. Lisella, Summit Hill, and John Daderko, Coaldale, Pa.

Application July 21, 1948, Serial No. 39,898

5 Claims. (Cl. 76—66)

This invention relates to a saw set and has for its primary object simultaneously to set the teeth of a saw blade.

Another object is to insure accuracy of the angle to which the teeth are bent, and to enable different sized teeth to be easily and quickly set.

The above and other objects may be attained by employing this invention which embodies among its features clamp means for engaging opposite sides of a saw blade adjacent a row of teeth extending along one longitudinal edge thereof, a pressure plate mounted on each side of the clamp means above the top thereof to move toward and away from a saw blade held by said clamp means, said pressure plates lying along divergent planes at obtuse angles to a saw blade held in said clamp means, saw setting teeth on adjacent edges of the pressure plates with the teeth of one plate engaging alternate teeth of the saw while the teeth of the other plate engage the intermediate teeth of the saw and means simultaneously to advance the pressure plates toward a saw blade held in said clamp means and the saw setting teeth into engagement with the teeth of the saw blade.

Other features include means detachably to support the pressure plates in proper position for operation on a saw held in the clamp means so that the plates may be removed and different plates substituted for operating on saws having different sized teeth.

In the drawings:

Figure 3 is an end view of the saw set illustrated in Figures 1 and 2.

Figure 1:
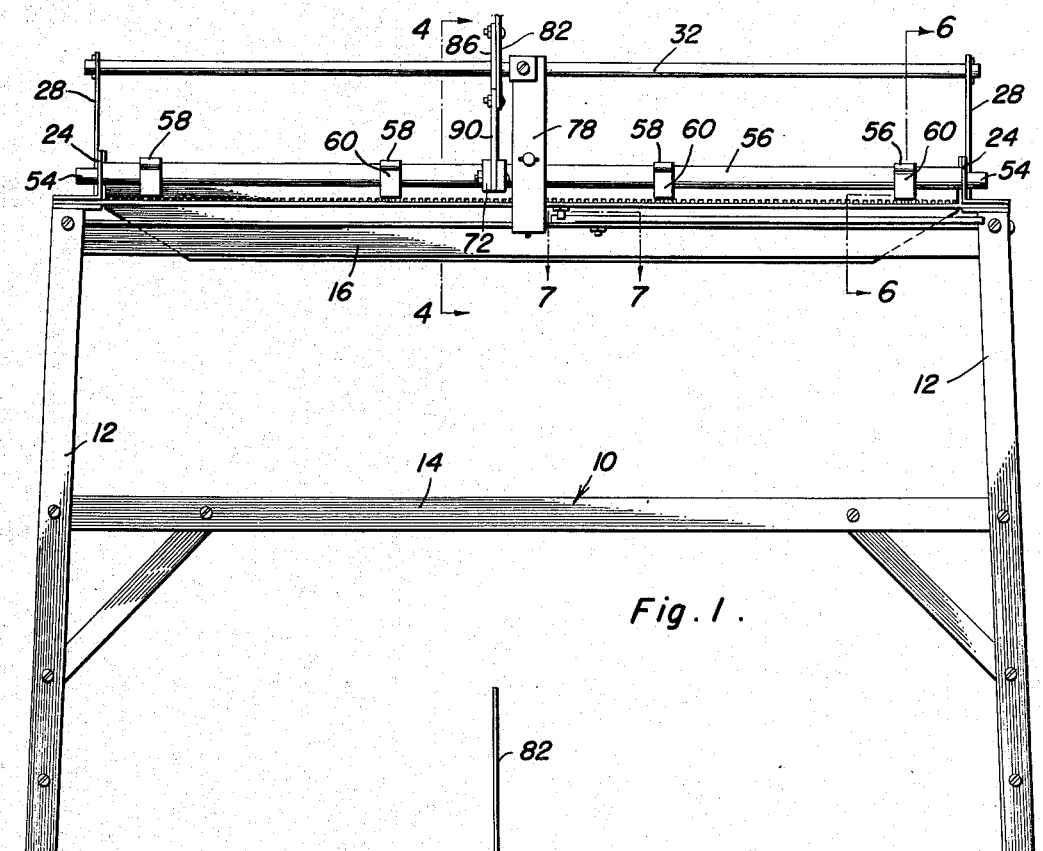
Figure 1 is a side view of a saw set embodying the features of this invention.

Figure 4 is a vertical sectional view on a slightly enlarged scale taken substantially along the line 4—4 of Figure 1, and showing the parts in a position ready to receive a saw blade, Figure 5 is a view similar to Figure 4, illustrating the parts in another position, Figure 6 is a fragmnetary sectional view taken substantially along the line 6—6 of Figure 1 on a slightly enlarged scale, Figure 7 is a fragmentary sectional view taken substantially along the line 7—7 of Figure 1, Figure 8 is a fragmentary perspective view of one of the eccentric shafts, and Figure 9 is a perspective view of one of the guards used for locating a saw blade in the device.

Referring to the drawings in detail a supporting frame designated generally 10 is comprised of end legs 12 which are joined together intermediate their ends by horizontally extending side bars 14 and adjacent their upper ends by a longitudinally extending horizontal angle bar 16. Extending longitudinally between the leg members 12 in spaced parallel relation with the angle bar 16 is a jaw member 18 having a depending flange 20 which serves as the clamping face for engaging one side of a saw blade when the latter is to be held in tooth setting position. Opposite end portions of the fixed clamp jaw 18 overlie the upper cross bar 22 of the leg members 12 and form spacers for holding end brackets 24 in spaced relation to the upper ends of the leg members. Each end bracket 24 is provided adjacent its forward and rear end with an opening 26, the purpose of which will be more fully hereinafter explained. Projecting upwardly from each end bracket 24 is an arm 28, and these arms are pierced with aligning openings 30 for the reception of a longitudinally extending tie bar 32 which also serves as the fulcrum point for a hand lever to be more fully hereinafter described. Each end member 24 is provided midway between opposite ends with vertically spaced internally screw threaded epenings for the reception of attaching screws 34 by which guard members 36 are secured to the end members 24. Each guard member 36 is provided at its lower end with a horizontally extending tongue or stop 38 which serves to limit the upward movement of a saw blade when the latter is being entered into the device.

Figure 2:
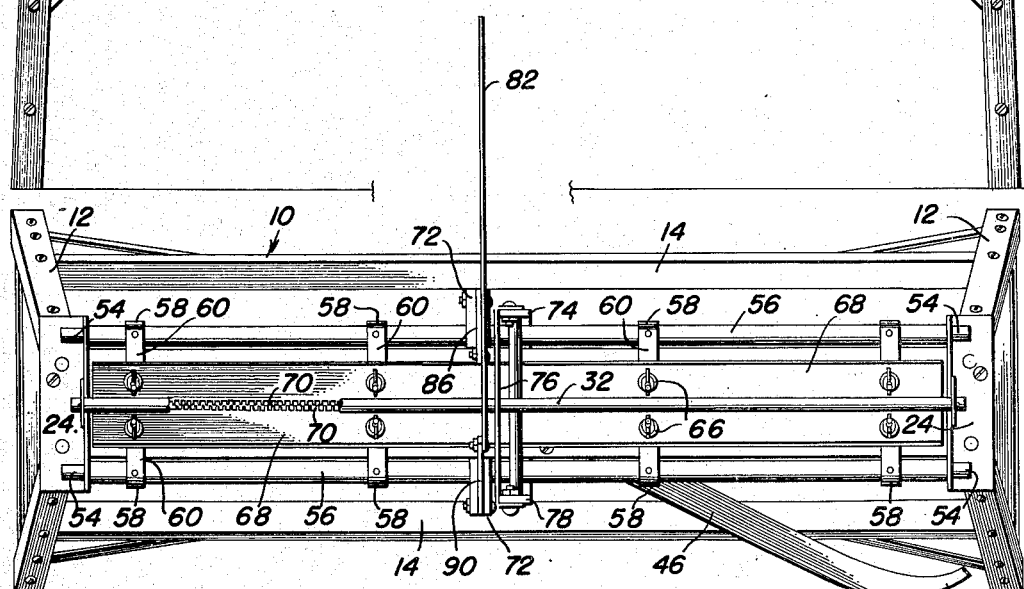
Figure 2 is a plan view of the saw set illustrated in Figure 1.

Slidably supported on the upper end of each leg immediately beneath the bracket 24 thereof is one end of a movable jaw member 40 which is provided with a depending flange 42 which when the jaw member 40 is advanced toward the jaw member 18 is adapted to engage the face of a saw blade opposite that engaged by the flange 20 in order to clamp the saw blade in position in the device. It will be understood of course that opposite ends of the jaw member 40 slide in the space between the top of its respective leg and the bracket 24 thereon. Pivotally mounted on the top flange of the longitudinally extending tie bar 16 substantially midway between opposite ends thereof as at 44 is a hand lever 46, one end of which extends outwardly beyond the frame 10 and is equipped with a hand grip 48 by means of which the lever may be swung in a horizontal arc about the pivot 44. The end of the hand lever 46 remote from the grip 48 is provided with an extension 50 which when the hand lever is swung outwardly about the pivot 44 is adapted to engage the depending flange 42 of the jaw member 40 and advance the jaw member 40 toward the jaw member 18 in order to clamp a saw blade in place. A suitable stop 52 is carried by the jaw member 40 intermediate its ends and projects downwardly in the path of movement of the extension 50, so that when the hand lever 46 is moved into position illustrated in Figure 2, the jaw member 40 will positively be retracted from clamping relation with the jaw member 18.

Mounted for rotation in the openings 26 in the end brackets 24 are the eccentric trunnions 54 of a pair of parallel shafts 56. The axis of the trunnions 54 of each shaft align so that as the shafts are rotated, the major portions thereof will move eccentrically about the axis of the trunnions. Mounted for rotation with relation to the shafts 56 and spaced longitudinally thereon are fingers 58, the upper surfaces 60 of which incline downwardly toward the space between the flanges 20 and 42, of the jaws 18 and 40 respectively, and lie in intersecting planes which lie at obtuse angles with relation to a saw blade clamped between the jaw members 18 and 40. Each finger 58 is provided in its upper surface with a recess 62 and at spaced intervals with longitudinally extending openings 64 for the reception of suitable screws 66, the threaded ends of which extend upwardly through the upper face 60 of its respective finger 58 and is equipped with a wing nut 66. Pressure plates or die members 68 are detachably seated in the recesses 62, and held therein by the wing nuts 66. These pressure plates 68 are provided along their adjacent edges with spaced saw setting teeth 70 which as illustrated in Figure 5 are so related that when the plates are advanced toward one another, the fingers will intermesh.

Clamped to each shaft 56 intermediate its ends is a radially extending bracket arm 72 by means of which the shaft may be rotated. A suitable supporting bracket 74 is fixed to the underside of the horizontal flange of the jaw member 18 and extends upwardly adjacent one side of the device. A cross bar 76 is attached to the upper end of the bracket arm and is pierced with an opening to receive the longitudinal tie bar 32, and the opposite end of the cross bar 76 is fixed to a bracket 78, the lower end of which is attached as by a screw 80 to the longitudinally extending bar 16. Rockably supported on the tie bar 32 adjacent the cross bar 76 is a hand lever 82 and pivotally coupled as at 84 to the hand lever 82 on one side of the tie bar 32 is one end of a link 86, the opposite end of which is pivotally connected as at 88 to the lever arm 72 of the shaft 56 on the same side of the tie bar 32. A link 90 is pivotally connected at one end as at 92 to the lever 82 on the side of the tie bar 32 remote from the pivot 84, and the opposite end of the link 90 is pivotally connected as at 94 to the lever arm 72 on the shaft 56 on the opposite side of the tie bar 32. It will thus be seen that as the hand lever 82 is rocked about the axis of the tie bar 32, the shafts 56 will be rotated in opposite directions to advance or retract the pressure plates 68 with relation to the jaw members 18 and 40.

In use a saw to be sharpened is entered into the space between the jaw members 18 and 40 with the parts in the position illustrated in Figure 4 so that the upper edges of the teeth of the saw blade lie between the toothed edges of the plates 68. It will be understood of course that the hand lever 46 has previously been moved into the position illustrated in Figure 2 to retract the jaw member 40. With the upper edges of the endmost teeth of the saw bearing against the stops 38, the hand lever 46 is moved about its pivot 44 to move the end 50 into contact with the flange 42 of the jaw member 40, thus advancing the movable jaw member toward the fixed jaw member 18 and clamping the saw blade between the flanges 20 and 44. With the saw thus positioned in the device the hand lever 82 is moved about the axis of the tie bar 32 from the position shown in Figure 4 to substantially the position shown in Figure 5, thus rocking the shafts 56 and advancing the fingers 58 and pressure plates 68 toward the saw blade. As the pressure plates 68 advance, the teeth 70 thereof will engage the teeth of the saw blade and bend them to the desired position with but a single operation. Obviously the obtuse angles of the pressure plates 68 will be such as to establish the proper set to the teeth of the saw blade so long as the ends of the teeth 70 on the pressure plates lie perpendicular to the planes of their respective pressure plates. After the saw has been properly set it may be removed by moving the hand lever 46 about its pivot 44 and so that the end 50 will contact the pin 52 and move the movable jaw member 40 to retracted position. Upon moving the hand lever 82 to retract the pressure plates 68 the device is ready for a repeat operation.

While in the foregoing there has been shown and described the preferred embodiment of this invention it is to be understood that minor changes in the details of construction, combination and arrangement of parts may be resorted to without departing from the spirit and scope of the invention as claimed.

Having described the invention, what is claimed as new is:

1. A saw set for a saw blade having a row of saw teeth along one longitudinal edge, said saw set comprising clamp means for engaging opposite sides of a saw blade adjacent the teeth thereof, a shaft mounted above said clamp means on each side thereof to rock about a longitudinal axis which lies parallel to the clamp means, the major portion of the periphery of each shaft being eccentric to the axis about which the shaft rocks, longitudinally spaced fingers on each shaft, said fingers extending toward the clamp means, pressure plates detachably connected to the fingers for movement therewith toward and away from the clamp means, saw setting teeth on the adjacent edges of the pressure plates for engagement with the teeth of a saw held in said clamp means when the plates are advanced toward one another and means to rock the shafts and advance the pressure plates toward a saw blade held in the clamp means.

2. The combination of claim 1, wherein said last means is common to both of said shafts for simultaneously advancing said pressure plates.

3. A saw set for a saw blade having a row of saw teeth along one longitudinal edge, said saw set comprising clamp means for engaging opposite sides of a saw blade adjacent the teeth thereof, a shaft mounted above said clamp means on each side thereof to rock about a longitudinal axis which lies parallel to the clamp means, the major portion of the periphery of each shaft being eccentric to the axis about which the shaft rocks, longitudinally spaced fingers on each shaft, said fingers extending toward the clamp means, pressure plates detachably connected to the fingers for movement therewith toward and away from the clamp means, saw setting teeth on the adjacent edges of the pressure plates for engagement with the teeth of a saw held in said clamp means when the plates are advanced toward one another and means to rock the shafts and advance the pressure plates toward a saw blade held in the clamp means and the pressure plates lying along divergent planes which lie at obtuse angles to a saw blade held in the clamp means.

4. A saw set for a saw blade having a row of saw teeth along one longitudinal edge, said saw set including clamp means for engaging opposite side faces of a saw blade adjacent the teeth thereof, a pair of spaced parallel shafts mounted to rock about longitudinal axes above and on opposite sides of the clamp means, the major portion of each shaft being eccentric to the axis about which the shaft rocks, longitudinally spaced fingers on each shaft the upper faces of which lie at obtuse angles relative to a saw blade held in the clamp means, pressure plates detachably mounted on the upper faces of the fingers and movable therewith toward and away from a saw blade clamped in the clamp means, saw setting teeth on the adjacent edges of the pressure plates and means to rock said shafts and advance or retract said plates relative to a saw blade held in said clamp means.

5. A saw set for a saw blade having a row of saw teeth along one longitudinal edge, said saw set comprising clamp means for engaging opposite sides of a saw blade adjacent the teeth thereof, a shaft mounted above said clamp means on each side thereof to rock about a longitudinal axis which lies parallel to the clamp means, the major portion of the periphery of each shaft being eccentric to the axis about which the shaft rocks, pressure plates, means connecting each of the pressure plates to one of the shafts responsive to rocking the shafts to move the pressure plates towards and away from the clamp means, saw setting teeth on the adjacent edges of the pressure plates for engagement with the teeth of a saw held in said clamp when the plates are advanced toward one another and means to rock the shafts and advance the pressure plates toward a saw blade held in the clamp means.

MICHAEL DADERKO, Sr.
ROBERT A. LISELLA.
JOHN DADERKO.

REFERENCES CITED

The following references are of record in the file of this patent:

UNITED STATES PATENTS

| Number | Name | Date |
|---|---|---|
| 640,471 | Kistner | Jan. 2, 1900 |
| 930,616 | Redifer | Aug. 10, 1909 |
| 980,877 | Milholland | Jan. 3, 1911 |
| 1,139,818 | Smith | May 18, 1915 |
| 1,217,822 | Poppenhagen | Feb. 27, 1917 |
| 1,241,772 | Serfozo | Oct. 2, 1917 |
| 1,315,222 | Genova | Sept. 9, 1919 |
| 1,612,618 | Durham et al. | Dec. 28, 1926 |